United States Patent
Ye et al.

(10) Patent No.: US 12,421,701 B2
(45) Date of Patent: Sep. 23, 2025

(54) FAUCET

(71) Applicant: Xiamen Lota International Co., Ltd., Fujian (CN)

(72) Inventors: Liming Ye, Fujian (CN); Shuanglin Bai, Fujian (CN); Chuanbao Zhu, Fujian (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 110 days.

(21) Appl. No.: 18/530,740

(22) Filed: Dec. 6, 2023

(65) Prior Publication Data

US 2024/0309620 A1    Sep. 19, 2024

(30) Foreign Application Priority Data

Mar. 17, 2023  (CN) .......................... 202320519961.8

(51) Int. Cl.
 *E03C 1/04* (2006.01)
 *E03C 1/02* (2006.01)
 *F16K 11/00* (2006.01)

(52) U.S. Cl.
 CPC ............ *E03C 1/0404* (2013.01); *E03C 1/021* (2013.01); *F16K 19/006* (2013.01); *E03C 2001/0415* (2013.01)

(58) Field of Classification Search
 CPC ........ E03C 1/021; E03C 1/023; E03C 1/0404; E03C 1/0405; E03C 2001/0415; E03C 2001/0417; F16K 19/006

USPC ...................................... 4/675–678; 137/801
See application file for complete search history.

(56) References Cited

U.S. PATENT DOCUMENTS

| | | | |
|---|---|---|---|
| 12,065,813 B2 * | 8/2024 | Downey | E03C 1/0404 |
| 2023/0133408 A1 * | 5/2023 | Zhou | E03C 1/0405 4/676 |
| 2024/0271399 A1 * | 8/2024 | Ye | E03C 1/0403 |

FOREIGN PATENT DOCUMENTS

| | | | | |
|---|---|---|---|---|
| CN | 109210255 A | * | 1/2019 | E03C 1/0403 |
| WO | WO-2019144873 A1 | * | 8/2019 | E03C 1/0404 |

\* cited by examiner

*Primary Examiner* — Tuan N Nguyen
(74) *Attorney, Agent, or Firm* — Cooper Legal Group, LLC

(57) ABSTRACT

A faucet comprises a faucet body, a water outlet mechanism, and a switch mechanism. The faucet body comprises a pull-out water outlet head and a pull-out pipe connected to the pull-out water outlet head, and the faucet body comprises a water outlet seat. The water outlet mechanism is rotatably connected to the water outlet seat, and the water outlet mechanism is configured to rotate. The switch mechanism comprises a valve member and a connecting pipe connected to the water outlet seat and the valve member to be in communication with the water outlet mechanism. The pull-out pipe is connected to the pull-out water outlet head and the valve member, and the pull-out pipe is configured to pass through and slide in a pull-out channel. The valve member is configured to control a connection between an external water source and at least one of the connecting pipe or the pull-out pipe.

10 Claims, 5 Drawing Sheets

FAUCET

RELATED APPLICATIONS

This application claims priority to Chinese patent application number 202320519961.8, filed on Mar. 17, 2023. Chinese patent application number 202320519961.8 is incorporated herein by reference.

FIELD OF THE DISCLOSURE

The present disclosure relates to a faucet.

BACKGROUND OF THE DISCLOSURE

The faucet in the prior art comprises a faucet shell, a valve seat, and a valve core. The valve seat is arranged in the faucet shell, and the valve core is arranged in the faucet shell and connected to the valve seat. The faucet further comprises a hot water pipe and a cold water pipe which extend from a bottom of the faucet shell, and the hot water pipe and the cold water pipe are respectively connected to the valve seat to be in fluid communication with the valve core. The valve core controls a mixing of hot water and cold water to form mixed water to flow out from a water outlet bent tube. In this type of faucet structure, only one water outlet terminal is provided. Although faucets with multiple water outlet terminals have appeared in the prior art, a flushing range of the faucet is still small for a pool with two sinks.

BRIEF SUMMARY OF THE DISCLOSURE

The present disclosure provides a faucet to solve the deficiencies in the background.

In order to solve the technical problem, a technical solution of the present disclosure is as follows.

A faucet comprises a faucet body, a water outlet mechanism, and a switch mechanism. The faucet body comprises a pull-out water outlet head and a pull-out pipe connected to the pull-out water outlet head, and the faucet body comprises a water outlet seat. The water outlet mechanism is rotatably connected to the water outlet seat around an axis of the water outlet seat, and the water outlet mechanism is configured to rotate around an axis of the water outlet mechanism. The water outlet mechanism comprises one or more water outlet ports, and the switch mechanism comprises a valve member and a connecting pipe. The connecting pipe is connected to the water outlet seat and the valve member to be in communication with the water outlet mechanism, and the pull-out pipe is connected to the pull-out water outlet head and the valve member. The pull-out pipe is configured to pass through and slide in a pull-out channel of the water outlet seat, and the valve member is configured to be connected to an external water source and control a connection between the external water source and at least one of the connecting pipe or the pull-out pipe.

In preferred embodiment, the valve member is disposed below the water outlet seat, and the connecting pipe is located outside a vertical projection of an entrance of the pull-out channel.

In preferred embodiment, the valve member comprises a first water outlet facing upward, and a lower end of the water outlet seat comprises a water inlet. The first water outlet and the water inlet are located on a same vertical line, and the connecting pipe is respectively connected to the first water outlet and the water inlet. The entrance of the pull-out channel is located at the lower end of the water outlet seat and is spaced apart from the water inlet.

In preferred embodiment, the valve member comprises a second water outlet facing downward, and a first end of the pull-out pipe is connected to the second water outlet. A second end of the pull-out pipe passes through the pull-out channel to be connected to the pull-out water outlet head.

In preferred embodiment, the water outlet mechanism comprises a rotating sleeve and a water outlet shaft, and the rotating sleeve is rotatably sleeved on the water outlet seat so that the water outlet mechanism is rotatably connected to the water outlet seat around the axis of the water outlet seat. The water outlet shaft is rotatably connected to the rotating sleeve so that the water outlet mechanism is configured to rotate around the axis of the water outlet mechanism, and the water outlet shaft comprises the one or more water outlet ports.

In preferred embodiment, an outer peripheral wall of the water outlet seat comprises an annular groove, and the rotating sleeve is sleeved outside the annular groove correspondingly. A water passing space is formed between the water outlet seat and the annular groove, and a lower end of the water outlet seat comprises a water inlet connected to the connecting pipe. The water inlet is connected to a bottom of the water passing space, and the water passing space is connected to the water outlet shaft.

In preferred embodiment, the rotating sleeve comprises a first circumferential positioning block, and the outer peripheral wall of the water outlet seat comprises a second circumferential positioning block. The rotating sleeve is configured to rotate to enable two ends of the first circumferential positioning block to be respectively positioned on and abut the second circumferential positioning block.

In preferred embodiment, an outer peripheral wall of the rotating sleeve comprises a connecting joint, and one end of the water outlet shaft is rotatably connected to the connecting joint.

In preferred embodiment, the one end of the water outlet shaft comprises a third circumferential positioning block, and the connecting joint comprises a fourth circumferential positioning block. The water outlet shaft is configured to rotate to enable two ends of the third circumferential positioning block to be respectively positioned on and abut the fourth circumferential positioning block.

In preferred embodiment, the valve member is configured to control the external water source to be connected to the connecting pipe and the pull-out pipe at the same time, and the faucet further comprises a first water outlet control member and a second water outlet control member. The first water outlet control member is configured to control a water discharge from the water outlet mechanism, and the second water outlet control member is configured to control a water discharge from the pull-out water outlet head.

Compared with the existing techniques, the technical solution has the following advantages.

The faucet comprises a faucet body, a water outlet mechanism, and a switch mechanism. The faucet body comprises the pull-out water outlet head and a pull-out pipe connected to the pull-out water outlet head, and the faucet body comprises the water outlet seat. The water outlet mechanism is rotatably connected to the water outlet seat around an axis of the water outlet seat, and the water outlet mechanism is configured to rotate around the axis of the water outlet mechanism. The water outlet mechanism comprises the one or more water outlet ports, and the switch mechanism comprises the valve member and the connecting pipe. The connecting pipe is connected to the water outlet seat and the valve member to be in communication with the water outlet mechanism, and the pull-out pipe is connected to the pull-out water outlet head and the valve member. The pull-out pipe is configured to pass through and slide in a pull-out channel of the water outlet seat, and the valve member is configured to be connected to an external water source and control the connection between the external water source and at least one of the connecting pipe or the pull-out pipe. The water outlet mechanism is rotatably connected to the water outlet seat around the axis of the water outlet seat, and the water outlet mechanism is configured to rotate around an axis of the water outlet mechanism, so the water outlet mechanism can achieve a larger rotation range to achieve a larger adjustment range of a water outlet position. In addition, the valve member and the water outlet seat are disposed separately so that it is simpler to set the relative position between the valve member and the water outlet seat, without the need to bring the valve member and the water outlet seat together, and the structure can be adapted to different faucet housing designs.

DETAILED DESCRIPTION OF THE EMBODIMENTS

The present disclosure will be further described below in combination with the accompanying drawings and embodiments.

Figure 1:
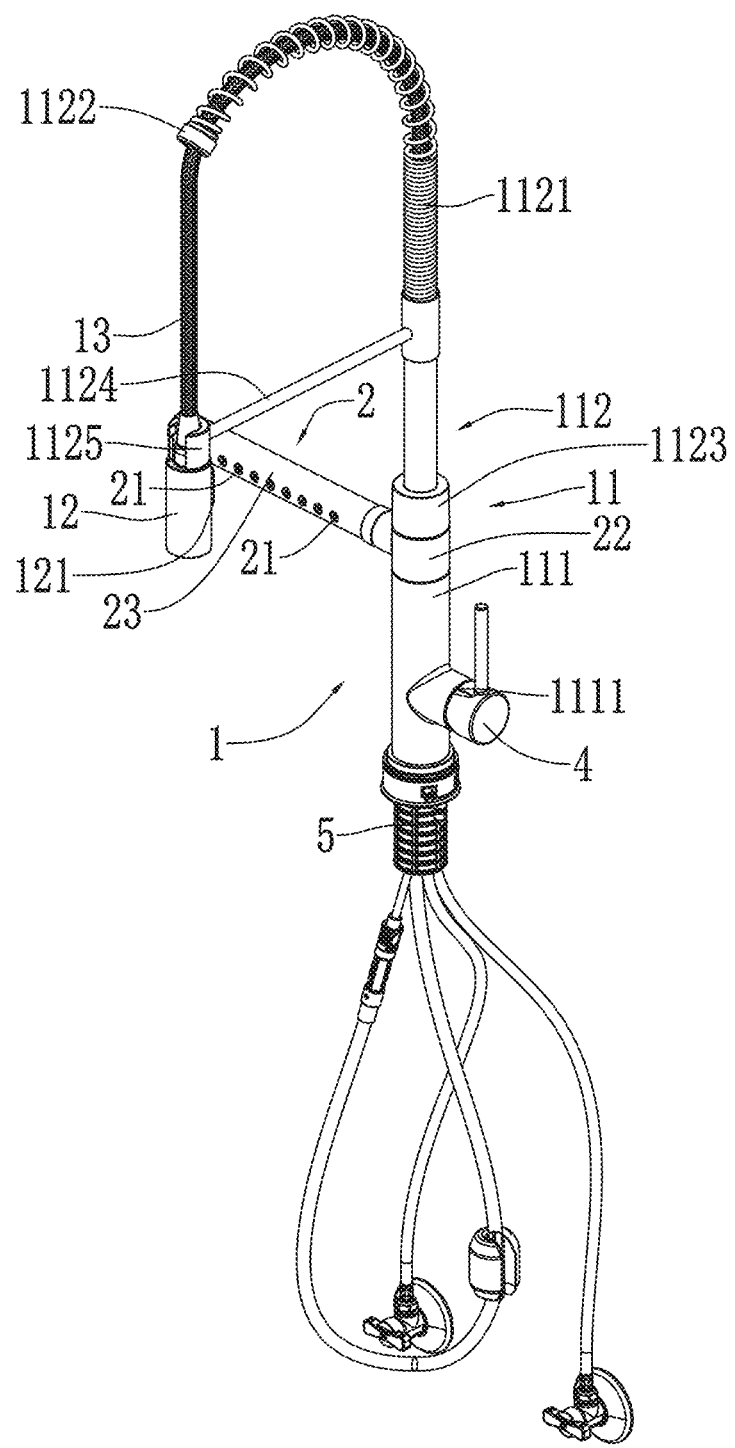
FIG. 1 illustrates a perspective view of a faucet in a preferred embodiment of the present disclosure.
Figure 2:
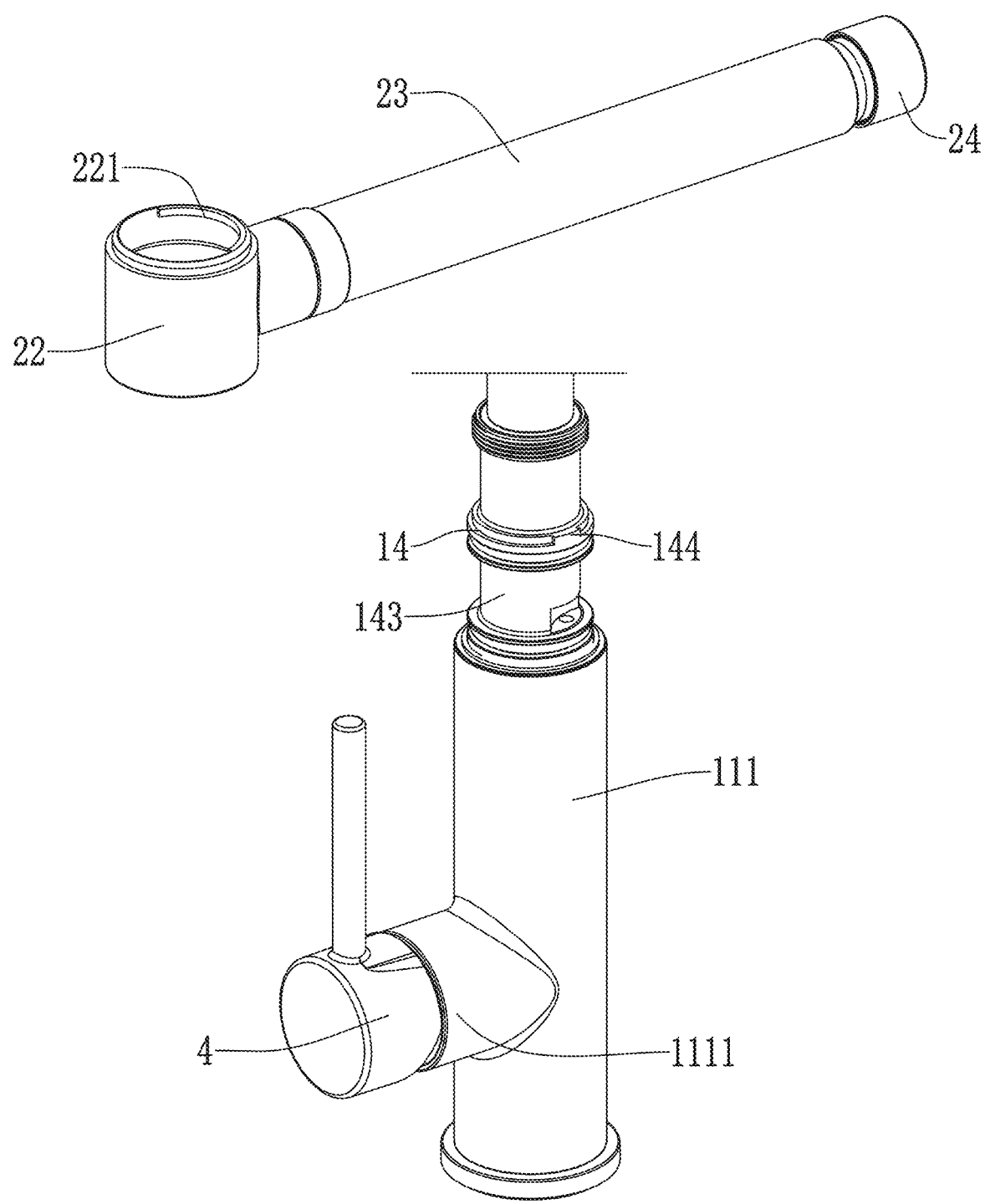
FIG. 2 illustrates a perspective view of a connection between a water outlet mechanism and a water outlet seat in the preferred embodiment of the present disclosure.
Figure 3:
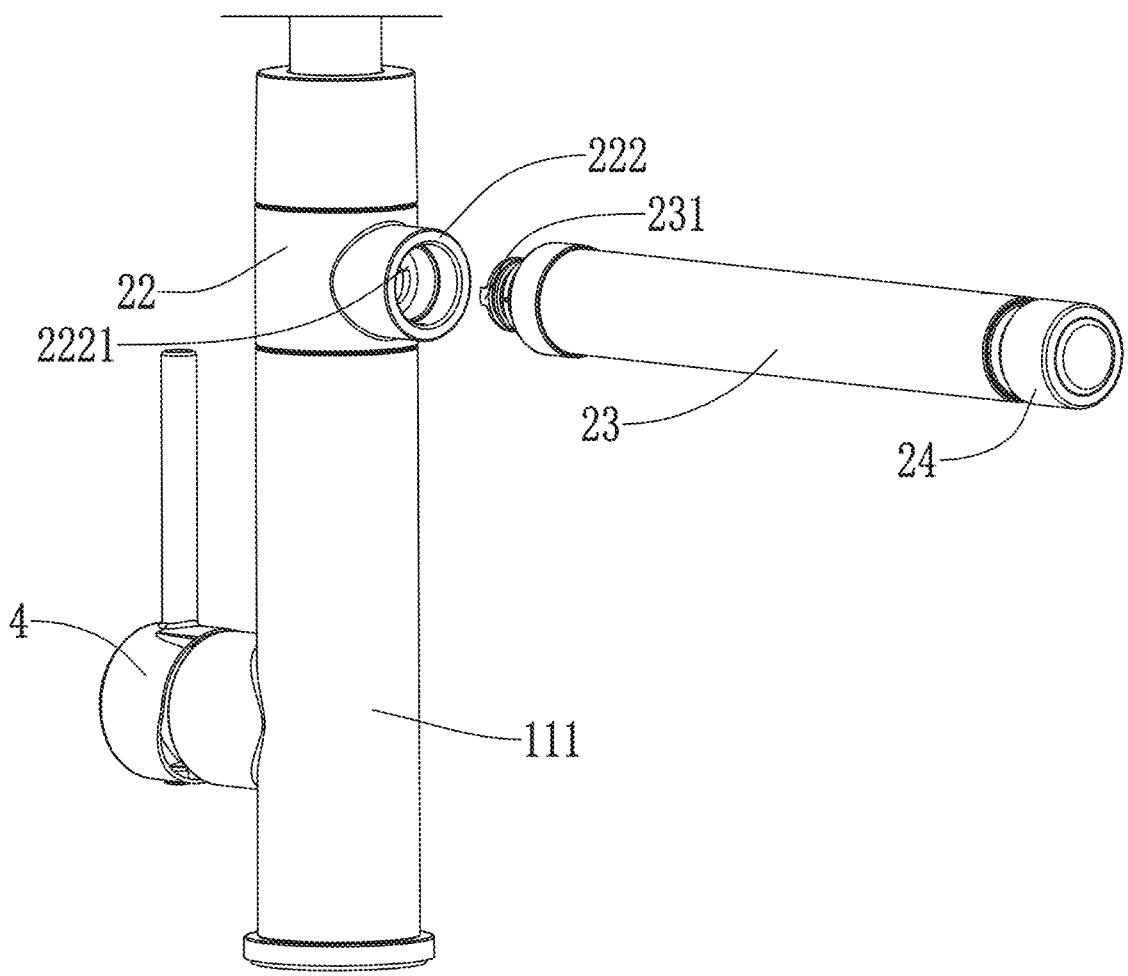
FIG. 3 illustrates a perspective view of a connection between the water outlet shaft and a rotating sleeve in the preferred embodiment of the present disclosure.
Figure 4:
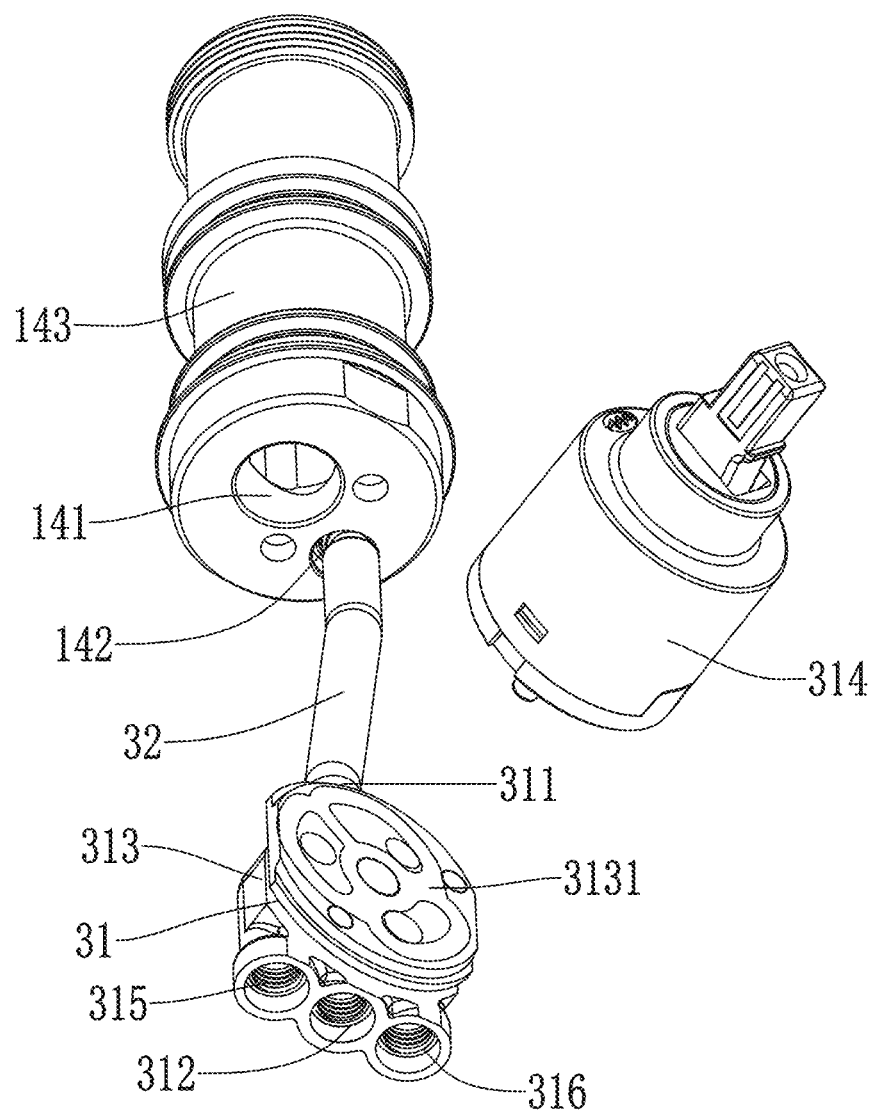
FIG. 4 illustrates a first perspective view of the water outlet seat, a connecting pipe, and a valve member in the preferred embodiment of the present disclosure.
Figure 5:
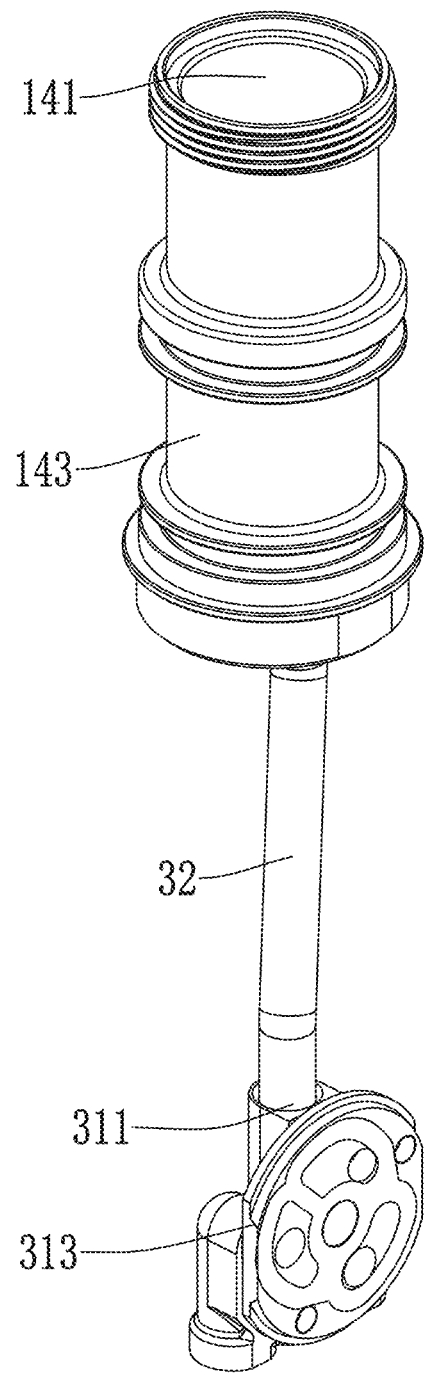
FIG. 5 illustrates a second perspective view of the water outlet seat, the connecting pipe, and the valve member in the preferred embodiment of the present disclosure.

Referring to FIGS. 1 to 5, a faucet is provided. The faucet comprises a faucet body 1, a water outlet mechanism 2, and a switch mechanism. The faucet body 1 comprises a faucet seat 11, a pull-out water outlet head 12, and a pull-out pipe 13 connected to the pull-out water outlet head 12. The faucet seat 11 comprises a fixed seat 111 and a rotating bent tube 112, and a lower end of the fixed seat 111 is fixedly connected to a countertop. The lower end of the fixed seat 111 is fixedly connected to a threaded tube 5, and an outer side of the threaded tube 5 is threaded with a nut seat. The lower end of the fixed seat 111 is configured to abut an upper side of the countertop, and the nut seat is configured to abut a lower side of the countertop. The rotating bent tube 112 is rotatably connected to the fixed seat 111. The rotating bent tube 112 comprises a bent tube 1121 wound from a metal wire. A distal end of the bent tube 1121 is connected to a positioning ring 1122, and an initial end of the bent tube 1121 is connected to a rotating ring 1123, which is rotatably connected to and disposed above the fixed seat 111. The rotating bent tube 112 further comprises a support rod 1124 and a positioning seat 1125 connected to a distal end of the support rod 1124.

The faucet body 1 further comprises a water outlet seat 14, and the water outlet seat 14 is disposed on the fixed seat 111. In this embodiment, the water outlet seat 14 has a rotary structure. A lower end of the water outlet seat 14 is fixedly connected to the fixed seat 111. The rotating ring 1123 is rotatably connected to an upper end of the fixed seat 111. The water outlet mechanism 2 is rotatably sleeved outside an outer peripheral wall of the water outlet seat 14. The water outlet mechanism 2 is rotatably connected to the water outlet seat 14 around an axis of the water outlet seat 14. The water outlet mechanism 2 is further configured to rotate around an axis of the water outlet mechanism 2. The water outlet mechanism 2 comprises one or more water outlet ports 21. The switch mechanism comprises a valve member and a connecting pipe 32. The connecting pipe 32 is connected to the water outlet seat 14 and the valve member to be in communication with the water outlet mechanism 2, and the pull-out pipe 13 is connected to the pull-out water outlet head 12 and the valve member. The pull-out pipe 13 passes through and slides in a pull-out channel 141 of the water outlet seat 14. The valve member is configured to be connected to an external water source and control a connection between the external water source and at least one of the connecting pipe 32 or the pull-out pipe 13. The valve member is connected to the external water source and connected to the water outlet seat 14 through the connecting pipe 32. A separate arrangement of the valve member and the water outlet seat 14 can make a relative position setting between the valve member and the water outlet seat 14 simpler and can be adapted to different kinds of faucets, and the valve member and the water outlet seat 14 can be used in different kinds of faucet housings. The pull-out channel 141 on the water outlet seat 14 can allow the pull-out pipe 13 to pass through, making full use of space.

In this embodiment, the valve member is disposed below the water outlet seat 14. The connecting pipe 32 is located outside a vertical projection of an entrance of the pull-out channel 141. The valve member comprises a first water outlet 311 facing upward, and a lower end of the water outlet seat 14 comprises a water inlet 142. The first water outlet 311 and the water inlet 142 are on a same vertical line, and the connecting pipe 32 is respectively connected to the first water outlet 311 and the water inlet 142. The entrance of the pull-out channel 141 is located at the lower end of the water outlet seat 14 and is spaced apart from the water inlet 142. The valve member comprises a second water outlet 312 facing downward. A first end of the pull-out pipe 13 is connected to the second water outlet 312, and a second end of the pull-out pipe 13 passes through the pull-out channel 141 to be connected to the pull-out water outlet head 12. The valve member comprises a valve seat 313 and a valve core 314. The valve seat 313 is in a shape of a sheet. An upper side of the valve seat 313 comprises the first water outlet 311. A lower side of the valve seat 313 comprises the second water outlet 312. The lower side of the valve seat 313 further comprises a hot water inlet 315 and a cold water inlet 316. The valve seat 313 further comprises a mounting surface 3131. The mounting surface 3131 faces a lateral opening 1111 of the fixed seat 111. The valve core 314 is installed from the lateral opening 1111 and connected to the mounting surface 3131. The valve core 314 is configured to receive hot water and cold water respectively from the hot water inlet 315 and the cold water inlet 316 and mix them to form mixed water. The valve core 314 can further control the mixed water to be connected to the first water outlet 311 or the second water outlet 312, or the valve core 314 can further control the mixed water to be connected to the first water outlet 311 and the second water outlet 312 at the same time. In this embodiment, the valve core 314 can control the mixed water to be connected to the first water outlet 311 and the second water outlet 312 at the same time. The faucet further comprises a handle structure 4 connected to the valve core 314, and the handle structure 4 is used to control the valve core 314. In this embodiment, the valve seat 313 and the valve core 314 are disposed in the fixed seat 111. The first end of the pull-out pipe 13 is connected to the second water outlet 312. The second end of the pull-out pipe 13 first extends downward from the lower end of the fixed seat 111, then passes through the lower end of the fixed seat 111, the entrance of the pull-out channel 141, the pull-out channel 141, and the rotating bent tube 112 in sequence to extend out of the distal end of the rotating bent tube 112, and finally connected to the pull-out water outlet head 12. The user can pull the pull-out water outlet head 12 and drive the pull-out pipe 13 to slide in the pull-out channel 141, and the pull-out water outlet head 12 can be locked on the positioning ring 1122 or the positioning seat 1125. When the pull-out water outlet head 12 is locked on the positioning seat 1125, a water outlet direction of the pull-out water outlet head 12 faces downward.

The water outlet mechanism 2 comprises a rotating sleeve 22 and a water outlet shaft 23. The rotating sleeve 22 is rotatably sleeved on the water outlet seat 14 so that the water outlet mechanism 2 is rotatably connected to the water outlet seat 14 around the axis of the water outlet seat 14. The water outlet shaft 23 is rotatably connected to the rotating sleeve 22 so that the water outlet mechanism 2 can rotate around the axis of the water outlet mechanism 2. The water outlet shaft 23 comprises the one or more water outlet ports 21. The outer peripheral wall of the water outlet seat 14 comprises an annular groove 143, and the rotating sleeve 22 is sleeved outside the annular groove 143 correspondingly. A water passing space is formed between the rotating sleeve 22 and the annular groove 143. The lower end of the water outlet seat 14 comprises the water inlet 142 connected to the connecting pipe 32, and the water inlet 142 is connected to a bottom of the water passing space. The water passing space is further connected to the water outlet shaft 23.

A distal end of the water outlet shaft 23 is disposed with a first water outlet control member 24. The first water outlet control member 24 is used to control a water discharge of the water outlet mechanism 2. The pull-out water outlet head 12 is disposed with a second water outlet control member 121, and the second water outlet control member 121 is used to control a water discharge of the pull-out water outlet head 12. When in use, the switch mechanism controls the external water source to be connected to the connecting pipe 32 and the pull-out pipe 13 at the same time. At this time, the second water outlet control member 121 can control the water to discharge from the pull-out water outlet head 12. The first water outlet control member 24 can control the water outlet shaft 23 to discharge the water. The switch mechanism functions as a master switch. In this embodiment, the first water outlet control member 24 and the second water outlet control member 121 are conventional on-off valves, which will not be described again here.

In this embodiment, the rotating sleeve 22 comprises a first circumferential positioning block 221, and the outer peripheral wall of the water outlet seat 14 comprises a second circumferential positioning block 144. The rotating sleeve 22 rotates to enable two ends of the first circumferential positioning block 221 to respectively abut the second circumferential positioning block 144.

An outer peripheral wall of the rotating sleeve 22 comprises a connecting joint 222, and one end of the water outlet shaft 23 is rotatably connected to the connecting joint 222. The one end of the water outlet shaft 23 comprises a third circumferential positioning block 231, and the connecting joint 222 comprises a fourth circumferential positioning block 2221. The water outlet shaft 23 rotates to enable two ends of the third circumferential positioning block 231 to respectively abut the fourth circumferential positioning block 2221.

When in use, the water outlet mechanism 2 can rotate around the axis of the water outlet seat 14 to change a water outlet direction. In this embodiment, since the fixed seat 111 extends in a vertical direction, the water outlet mechanism 2 can rotate on a horizontal plane, and the water outlet mechanism 2 achieves an angular range limitation through the first circumferential positioning block 221 and the second circumferential positioning block 144, and thus the water outlet mechanism 2 can achieve a larger rotation range to achieve a larger adjustment range of a water outlet position. The water outlet shaft 23 of the water outlet mechanism 2 can further rotate around an axis of the water outlet shaft 23. Therefore, the one or more water outlet port 21 on the water outlet shaft 23 can realize an adjustment of a water outlet angle, such as ejecting water horizontally, ejecting water upward at an angle, or ejecting water downward at an angle. The water outlet port 21 is arranged at intervals along an axial direction of the water outlet shaft 23. Therefore, the water outlet range of the water outlet mechanism 2 is larger.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:
1. A faucet, comprising:
a faucet body,
a water outlet mechanism, and
a switch mechanism, wherein:
the faucet body comprises a pull-out water outlet head and a pull-out pipe connected to the pull-out water outlet head,
the faucet body comprises a water outlet seat,
the water outlet mechanism is rotatably connected to the water outlet seat around an axis of the water outlet seat,
the water outlet mechanism is configured to rotate around an axis of the water outlet mechanism,
the water outlet mechanism comprises one or more water outlet ports,
the switch mechanism comprises a valve member and a connecting pipe,
the connecting pipe is connected to the water outlet seat and the valve member to be in communication with the water outlet mechanism,
the pull-out pipe is connected to the pull-out water outlet head and the valve member,
the pull-out pipe is configured to pass through and slide in a pull-out channel of the water outlet seat, and
the valve member is configured to be connected to an external water source and control a connection between the external water source and at least one of the connecting pipe or the pull-out pipe.

2. The faucet according to claim 1, wherein:
the valve member is disposed below the water outlet seat, and
the connecting pipe is located outside a vertical projection of an entrance of the pull-out channel.

3. The faucet according to claim 2, wherein:
the valve member comprises a first water outlet facing upward,
a lower end of the water outlet seat comprises a water inlet,
the first water outlet and the water inlet are located on a same vertical line,
the connecting pipe is respectively connected to the first water outlet and the water inlet, and
the entrance of the pull-out channel is located at the lower end of the water outlet seat and is spaced apart from the water inlet.

4. The faucet according to claim 3, wherein:
the valve member comprises a second water outlet facing downward,
a first end of the pull-out pipe is connected to the second water outlet, and
a second end of the pull-out pipe passes through the pull-out channel to be connected to the pull-out water outlet head.

5. The faucet according to claim 1, wherein:
the water outlet mechanism comprises a rotating sleeve and a water outlet shaft,
the rotating sleeve is rotatably sleeved on the water outlet seat so that the water outlet mechanism is rotatably connected to the water outlet seat around the axis of the water outlet seat,
the water outlet shaft is rotatably connected to the rotating sleeve so that the water outlet mechanism is configured to rotate around the axis of the water outlet mechanism, and
the water outlet shaft comprises the one or more water outlet ports.

6. The faucet according to claim 5, wherein:
an outer peripheral wall of the water outlet seat comprises an annular groove,
the rotating sleeve is sleeved outside the annular groove correspondingly,
a water passing space is formed between the water outlet seat and the annular groove,
a lower end of the water outlet seat comprises a water inlet connected to the connecting pipe,
the water inlet is connected to a bottom of the water passing space, and
the water passing space is connected to the water outlet shaft.

7. The faucet according to claim 6, wherein:
the rotating sleeve comprises a first circumferential positioning block,
the outer peripheral wall of the water outlet seat comprises a second circumferential positioning block, and
the rotating sleeve is configured to rotate to enable two ends of the first circumferential positioning block to be respectively positioned on and abut the second circumferential positioning block.

8. The faucet according to claim 5, wherein:
an outer peripheral wall of the rotating sleeve comprises a connecting joint, and
one end of the water outlet shaft is rotatably connected to the connecting joint.

9. The faucet according to claim 8, wherein:
the one end of the water outlet shaft comprises a third circumferential positioning block,
the connecting joint comprises a fourth circumferential positioning block, and
the water outlet shaft is configured to rotate to enable two ends of the third circumferential positioning block to be respectively positioned on and abut the fourth circumferential positioning block.

10. The faucet according to claim 1, wherein:
the valve member is configured to control the external water source to be connected to the connecting pipe and the pull-out pipe at a same time,
the faucet further comprises a first water outlet control member and a second water outlet control member,
the first water outlet control member is configured to control a water discharge from the water outlet mechanism, and
the second water outlet control member is configured to control a water discharge from the pull-out water outlet head.

* * * * *